(12) United States Patent
Lendaro

(10) Patent No.: US 7,092,041 B2
(45) Date of Patent: Aug. 15, 2006

(54) I²C BUS CONTROL FOR ISOLATING SELECTED IC'S FOR FAST I²C BUS COMMUNICATION

(75) Inventor: Jeffrey Basil Lendaro, Noblesville, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 616 days.

(21) Appl. No.: 10/433,803

(22) PCT Filed: Dec. 11, 2001

(86) PCT No.: PCT/US01/48036

§ 371 (c)(1),
(2), (4) Date: Jun. 5, 2003

(87) PCT Pub. No.: WO02/50690

PCT Pub. Date: Jun. 27, 2002

(65) Prior Publication Data

US 2004/0036808 A1  Feb. 26, 2004

Related U.S. Application Data

(60) Provisional application No. 60/256,966, filed on Dec. 20, 2000.

(51) Int. Cl.
*G06F 13/00* (2006.01)
*H04N 5/268* (2006.01)

(52) U.S. Cl. .................. 348/705; 348/706; 348/552; 710/316; 710/110

(58) Field of Classification Search .......... 348/705, 348/706, 552, 553, 718, 719, 720, 721; 710/316, 710/100, 110, 107, 261, 104, 305, 300; 370/420, 370/360, 362, 364
See application file for complete search history.

(56) References Cited

U.S. PATENT DOCUMENTS

| 5,892,933 | A |   | 4/1999 | Voltz ........................ 395/311 |
| 5,946,495 | A |   | 8/1999 | Scholhamer et al. ... 395/750.01 |
| 6,145,036 | A | * | 11/2000 | Barenys et al. ............ 710/300 |
| 6,205,504 | B1 | * | 3/2001 | Faust et al. ................ 710/305 |

(Continued)

FOREIGN PATENT DOCUMENTS

WO  00/30353  5/2000

OTHER PUBLICATIONS

Copy of Search Report dated Dec. 13, 2002.

*Primary Examiner*—David Ometz
*Assistant Examiner*—Jean W. Désir
(74) *Attorney, Agent, or Firm*—Joseph J. Laks; Robert D. Shedd; Reitseng Lin

(57) ABSTRACT

A system, method, and apparatus are provided for selectively isolating particular ICs on an I²C bus system. Selective isolation of particular ICs allows the particular isolated ICs to communicate with each other and/or with other components at a data transfer rate that is greater than the data transfer rate for the I²C bus system. A switch is operative in one mode to selectively isolate an auxiliary or separate I²C portion containing the ICs to be isolated and operative in another mode to allow the auxiliary I²C portion to be part of the main I²C bus sys portion tem. Proper pull-up resistors associated with the switch aid in allowing a faster data transfer rate by speed up of the low to high transition for operation of the isolated ICs.

20 Claims, 5 Drawing Sheets

U.S. PATENT DOCUMENTS

| | | | |
|---|---|---|---|
| 6,339,806 B1 * | 1/2002 | Foster et al. | 710/313 |
| 6,397,278 B1 * | 5/2002 | Auranen et al. | 710/105 |
| 6,591,322 B1 * | 7/2003 | Ervin et al. | 710/110 |
| 6,622,188 B1 * | 9/2003 | Goodwin et al. | 710/105 |
| 6,725,320 B1 * | 4/2004 | Barenys et al. | 710/316 |
| 6,745,270 B1 * | 6/2004 | Barenys et al. | 710/104 |
| 6,769,078 B1 * | 7/2004 | Barenys et al. | 714/43 |
| 6,816,939 B1 * | 11/2004 | Bandholz et al. | 710/305 |
| 7,006,161 B1 * | 2/2006 | Testin | 348/730 |
| 2003/0191809 A1 * | 10/2003 | Mosley et al. | 709/213 |

* cited by examiner

I²C BUS CONTROL FOR ISOLATING SELECTED IC'S FOR FAST I²C BUS COMMUNICATION

This application claims the benefit, under 35 U.S.C. § 365 of International Application PCT/US01/48036, filed Dec. 11, 2001, which was published in accordance with PCT Article 21(2) on Jun. 27, 2002 in English and which claims the benefit of U.S. patent application No. 60/256,966, filed Dec. 20, 2000.

The present invention relates to the I²C bus/protocol and integrated circuits that utilize the I²C bus/protocol, and more particularly, to auxiliary circuits for use with the I²C bus/protocol and integrated circuits associated therewith.

Integrated circuits ("ICs") are extensively used in today's electronic devices. ICs are typically designed to perform particular functions, and as such, many different ICs are generally necessary for a modern electronic device to operate. The ICs of a modern electronic device must be able to cooperate with one another in order to orderly communicate (receive and/or transmit data/information) with one another.

Cooperation and communication in an IC environment includes the ability of an IC to send data/information to other ICs typically in response to a query signal from another IC and/or to receive data/information from other ICs. This is typically achieved by providing a communication link or channel between the ICs. One way to efficiently provide the communication link is to connect the ICs together via a bus structure. A bus structure is essentially a common communication channel for a plurality of ICs in an electronic device.

One well known bus system/structure is the Inter Integrated Circuit bus or the I²C bus (interchangeably, the I2C bus). The I²C bus system operates on an I²C protocol that allows a plurality of ICs to be connected to and be in communication with one another over a common, structured bus. The I²C bus system was developed by Phillips Semiconductor to provide a way to connect (i.e. provide communication between) a central processing unit (CPU) and associated peripheral ICs within a television environment. The I²C bus system has been used extensively in consumer electronic devices. Because of this, various IC's are designed for and include the necessary elements for operating in an I²C environment.

More specifically, the I²C bus system is a serial bus system. In implementing the I²C bus, each IC, (i.e. a device, driver, memory, or complex function IC/chip), or the like is assigned a unique address. A particular IC in the I2C system can then send and/or receive data to/from a second IC by using the address of the second IC. In maintaining the integrity of I²C, when a new IC is developed, the designer must apply for and obtain a unique IC address from the I²C authorizing/issuing entity (i.e. Phillips Semiconductor). This allows the I²C system to grow as more types of addressable devices/ICs are uniquely registered. The unique IC address is then hardwired internal to the IC. Phillips Semiconductor maintains these addresses (otherwise known as "slave addresses") in a registry, or the like, to assure integrity of the assigned addresses.

The I²C system, however, is generally constrained to transfer data according to a set protocol at a set clock speed. The main controller IC of the I²C system sets the transfer rate or speed (i.e. clock rate or bus speed). Thus all ICs connected to a particular I²C bus must communicate at the same speed, or data transfer rate. However, it may be desirable to allow some ICs to communicate at different clock speed under certain conditions.

For example, some ICs for certain consumer electronics applications may have power up I²C routines that load data from a memory at a given data transfer rate that may be different than the I²C bus speed set by the main micro in normal conditions of the I²C system. For example, liquid crystal on silicon displays for certain video display systems manufactured by Thomson Consumer Electronics, Inc. of Indianapolis, Ind., use ICs manufactured by Three-Five Systems, Inc, of Tempe, Ariz. The Three-Five Systems' ICs have a hard-coded power up I²C routine that loads the three Application Specific Integrated Circuits ("ASICs") from a 64K EEPROM (memory) at 400 KHz bus speed. With multiple ICs, including the Three-Five Systems' ICs on a given I²C bus branch, a suitable pull-up does not exist that allows the fast rise times required by the power up I²C routine and, with series resistance on the I²C bus, nor allows all of the I²C devices to pull the control lines effectively to the low state. In view of the above, it is desirable to provide a bus arrangement that allows particular ICs in an I²C system to communicate at speeds different than the communication speed of other ICs within an I²C system.

The present invention is a system, method, and apparatus for isolating select integrated circuits in a digital bus system. Particularly, the present invention is a system, method and apparatus for selectively isolating one or more integrated circuits disposed on various portions of an I²C bus system for a predetermined period of time. More particularly, the present invention is a system, method and apparatus for selectively isolating a plurality of integrated circuits of an I²C bus system for allowing the isolated integrated circuits to communicate at a data transfer rate that is different than the data transfer rate of the I²C bus system. Once isolated, the selected plurality of integrated circuits may communicate with each other independent of the remainder of the I²C bus system integrated circuits.

In one form, the present invention is an apparatus for selectively isolating a portion of an I²C bus system. The system includes a main I²C bus portion, a main controller IC in communication with the main I²C bus portion, an auxiliary I²C bus portion, and a switch interposed between the main I²C bus portion and the auxiliary I²C bus portion and in communication with the main controller IC. The switch is operative under control of the main controller IC to isolate the auxiliary I²C bus portion from the main I²C bus portion. The switch also provides control of the pull up is current for the auxiliary I²C bus portion.

In another form, the present invention is a method for selectively isolating a portion of an I²C bus system. The method includes the steps of: (a) providing a control signal to a switch interposed between a main I²C bus portion having a main data line and a main clock line, and an auxiliary I²C bus portion having an auxiliary data line and an auxiliary clock line, the switch having a first mode of operation in which the auxiliary data line is in communication with the main data line, and the auxiliary clock line is in communication with the main clock line, and a second mode of operation in which the auxiliary data line is isolated from the main data line, and the auxiliary clock line is isolated from the main clock line; and (b) utilizing the control signal to cause the switch to operate in either the first mode of operation or the second mode of operation.

In yet another form, the present invention is a television signal receiver. The television signal receiver includes a main I²C bus portion, a master controller IC in communication with the main I²C bus portion, a first plurality of I²C compatible ICs in communication with the main I²C bus portion, an auxiliary I²C bus portion, a second plurality of I²C compatible ICs in communication with the auxiliary I²C bus portion, and a switch interposed between the main I²C bus portion and the auxiliary I²C bus portion, and in communication with the master controller IC. The switch is under control of the master controller IC to selectively isolate the auxiliary I²C bus portion and thus the second plurality of I²C compatible ICs from the main I²C bus portion for a predetermined period of time.

The present invention allows the isolation of particular or select I²C portions or devices, while at the same time providing low impedance pull-ups (resistors). In turn, higher current pull-ups (resistors) allow operation of the isolated ICs at a higher speed. When the isolated ICs are returned to the main I²C bus, the resistors are out of the auxiliary circuit. During the time that the isolated ICs are reading data, the main micro of the I²C system can configure other I²C ICs on the I²C bus, thus saving start-up time.

The above-mentioned and other features and advantages of this invention, and the manner of attaining them, will become more apparent and the invention will be better understood by reference to the following description of all exemplary embodiment of the invention taken in conjunction with the accompanying drawings, wherein.

Corresponding reference characters indicate corresponding parts throughout the several figures.

Figure 1:
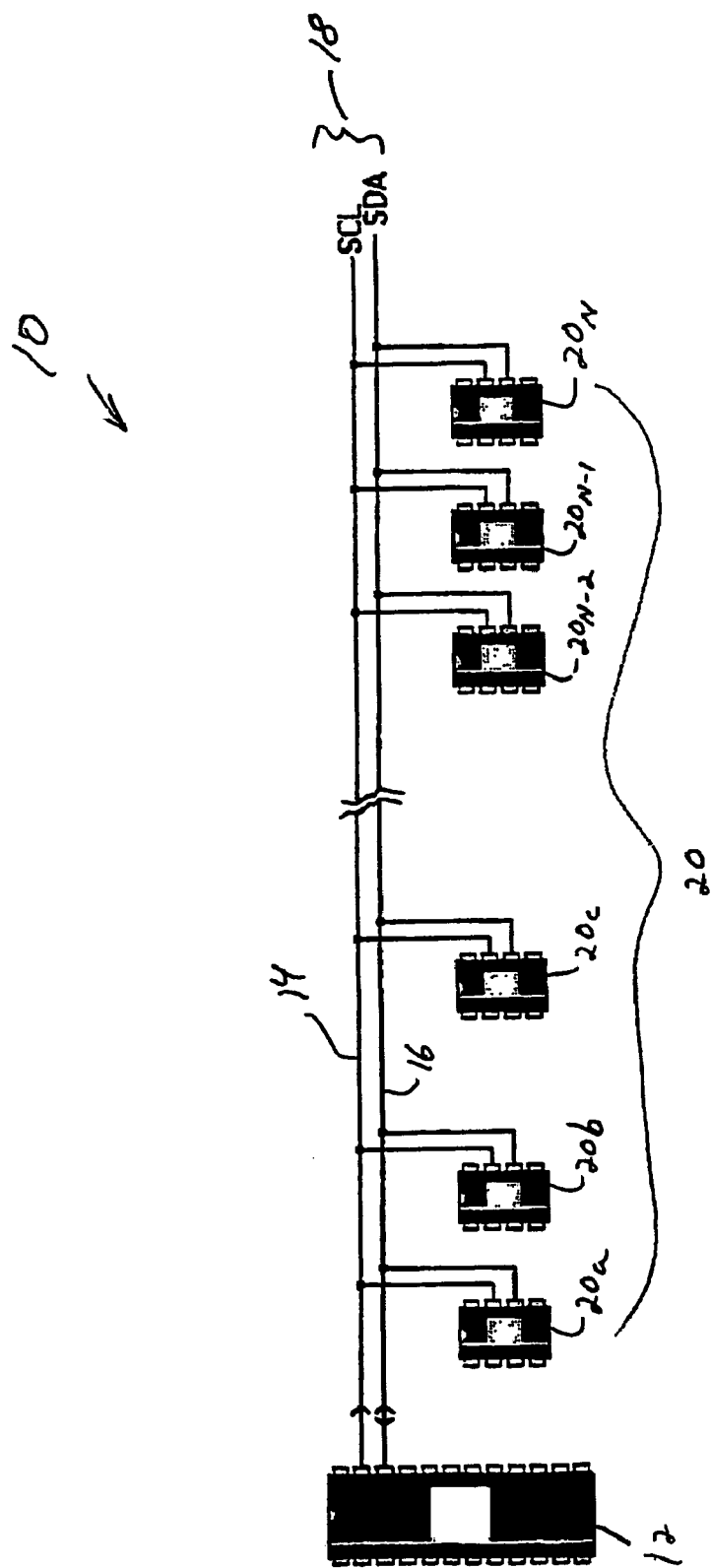
FIG. 1 is a diagram of an exemplary system comprising a plurality of ICs in communication with one another via the I²C bus/protocol.

Referring now to FIG. 1, there is depicted a system, generally designated 10, that represents a system in which a plurality of ICs are connected together and in communication with each other via a bus structure.

In particular, system 10 is an I²C bus/protocol system. I²C system 10 includes controller IC 12 connected to and in communication with an I²C bus, generally designated 18. Controller IC 12 may be referred to as the main IC, main micro, or the like, and is operative to initiate data transfers on bus 18. Controller IC 12 may be a microprocessor, a CPU or the like. I²C system 10 further includes a plurality of slave ICs, generally designated 20 (with various subscripts), that are connected to and in communication with the various other ICs via I²C bus 18.

I²C bus 18 consists of Serial Clock line (SCL) 14 and Serial Data line (SDA) 16. SCL line 14 is coupled to an I/O pin of main controller IC 12 and to an I/O pin of each slave IC 20 for supplying a serial clock signal to each slave IC 20. SDA line 16 is coupled to another I/O pin of the main controller IC 12 and to another I/O pin of each slave IC 20 for data transfer and general communication. Data transfer between the ICs is accomplished at a certain predetermined data rate (50 KHz).

Although SCL line 14 is a bi-directional line, the main controller IC 12 controls/generates the system clock and thus SCL line 14 has a single-headed arrow to designate the nature of data flow on the clock signal line. SDA line 16 is also a bi-directional line and thus has a double-headed arrow to designate the nature of data flow on the serial data line. Each slave ICs 20 is operative to receive protocol commands from main controller IC 12 and to respond appropriately.

In order to communicate with and between the plurality of slave ICs 20, each slave IC 20 is assigned a unique address. The unique address is hardwired into the respective slave IC 20, typically within an I²C bus interface section. The internal address of each slave IC 20 is thus fixed. Some of slave ICs 20 have only one fixed address, while some slave ICs may have more than one fixed address, typically due, at least in part, to having a plurality of internal I²C bus interface sections, each of which has a previously assigned I²C address.

Also, each slave IC 20 communicates with main controller IC 12 at a set I²C data rate, typically 50 KHz. Main controller IC 12 and slave ICs 20 also typically have a start-up routine that follows the standard I²C protocol.

In sum, the I²C system is a two-wire, bi-directional bus system that permits any two ICs to communicate with each other via bus 18 at any one time. Main controller IC 12 serves in a "master" mode of operation, initiates a data transfer on bus 18 and generates clock signals that permit the data transfer. Slave ICs 20 serve in a "slave" mode of operation when the slave IC 20 is being operated on or communicated to by main controller IC 12, whereby a particular slave IC 20 is instructed to either send or receive data. SCL line 14 propagates clock signals on I²C bus 18 from the main controller IC 12 to slave the ICs 20. Each main controller IC 12 (as there can be more than one main controller IC) generates its own clock signals when transferring data on bus 18. The second bi-directional wire of I²C bus 18, i.e. the serial data line (SDA) 16, transfers data using eight bit serial transactions. A ninth bit is typically utilized as an acknowledgement bit.

When both SCL line 14 and SDA line 16 are held "HIGH" or logic "1", no data can be transferred between two ICs. A HIGH to LOW (logic "0") transition on SDA line 16, while SCL line 14 is HIGH, indicates a START condition for the exchange of data bits. Conversely, a LOW to HIGH transition on SDA line 16, while SCL line 14 is HIGH, defines a STOP condition. Main controller IC 12 generates one clock pulse for each data bit transferred on SDA line 16, and the HIGH or LOW state of SDA line 16 can only change when the clock signal on SCL line 14 is in a LOW state.

It should be appreciated that system 10 of FIG. 1 is only exemplary of an environment/application in which the present invention may be utilized. Preferably, the present invention is applicable to and used in any system of ICs that utilize the I²C protocol/bus structure/system. However, the present invention may be used in other similar protocol/bus structures/systems. The type of ICs, and IC systems in which the present invention is utilized may take many forms and/or perform many functions. The exemplary system 10 of FIG. 1, may advantageously be part of the operation circuitry of a television signal processing device.

Figure 2:
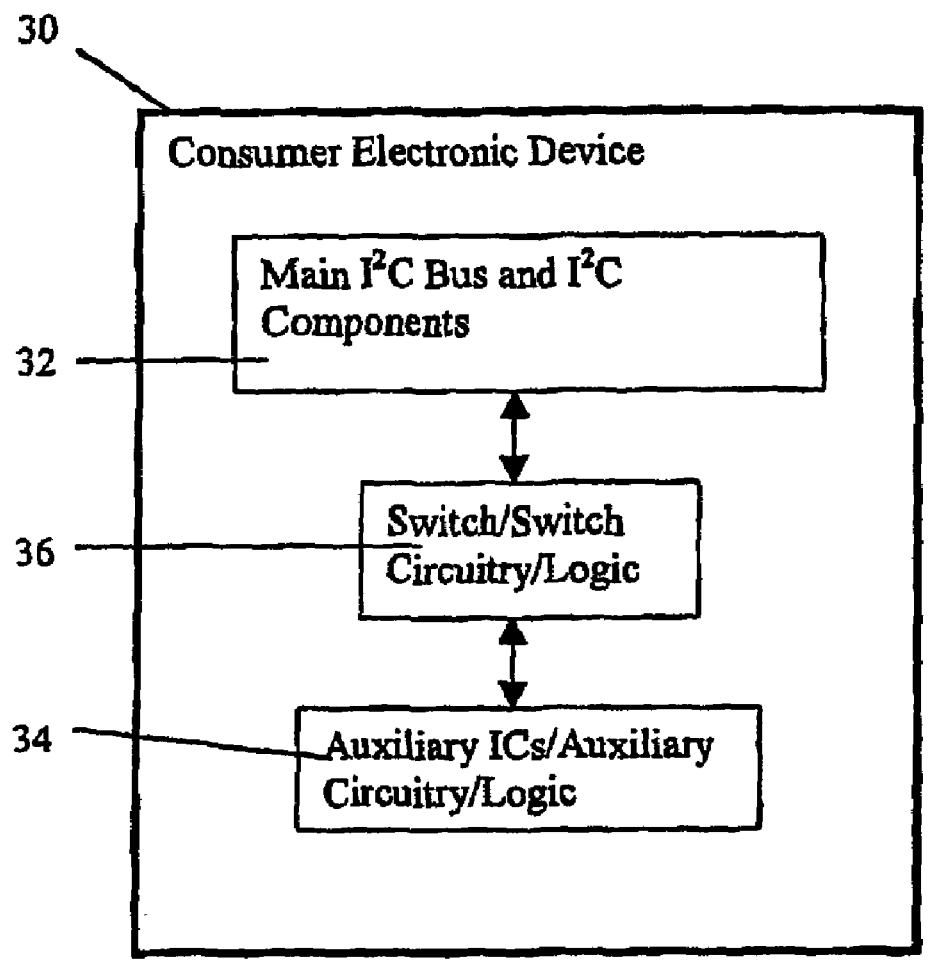
FIG. 2 is a block diagram representation of an apparatus suitable for implementing the present invention.

Referring to FIG. 2, there is depicted a block diagram representing an exemplary device in which I²C system 10 and the present invention may be used. FIG. 2 shows a consumer electronic device, generally designated 30, that may be a television signal receiver/processor, set-top box, satellite receiver, or any type of consumer electronic device that utilizes a digital bus protocol system such as the I²C system described above.

Consumer electronic device 30 includes a main I²C bus and I²C components as generally described above with reference to FIG. 1 and I²C components, generally designated 32. In accordance with an aspect of the present invention, consumer electronic device 30 includes auxiliary ICs within auxiliary circuitry or circuitry/logic, generally designated 34. Auxiliary ICs 34 are preferably I²C compatible. Auxiliary ICs 34 are connected to and in communication with the main I²C bus and I²C components 32 via a switch, switch circuitry/logic, or the like 36 (collectively, switch 36). Switch 36 is operative to selectively connect the auxiliary ICs with the main I²C system in one mode thereof, and to selectively isolate the auxiliary ICs from the main I²C system in another mode.

More particularly, auxiliary ICs 34 are operative to communicate via a data transfer rate (i.e. bus rate) that is greater than the bus rate of the main I²C bus and I²C components (i.e. at a high data transfer rate). As such, switch 36 is operative to isolate or disconnect auxiliary ICs 34 from main I²C bus/system 32 when it is necessary for auxiliary ICs 34 to communicate or perform an operation or function using high data transfer rate rather than the data rate of the main I²C system or when an auxiliary IC, or ICs, communicate or perform an operation or function within the circuitry/logic of auxiliary system 34.

In accordance with the present invention, device 30 operates in one of a plurality of modes. During a first state, or mode, switch 36 allows auxiliary ICs 34 to be isolated from the main I²C bus. The isolation allows the auxiliary ICs to communicate between each other and any other devices associated with auxiliary circuitry/logic 34. During a second state or mode, switch 36 operatively connects auxiliary ICs/circuitry 34 with main I²C bus/system 32 so that the auxiliary ICs are connected to and may communicate to ICs connected to the main I²C bus via the normal I²C protocol.

Figure 3:
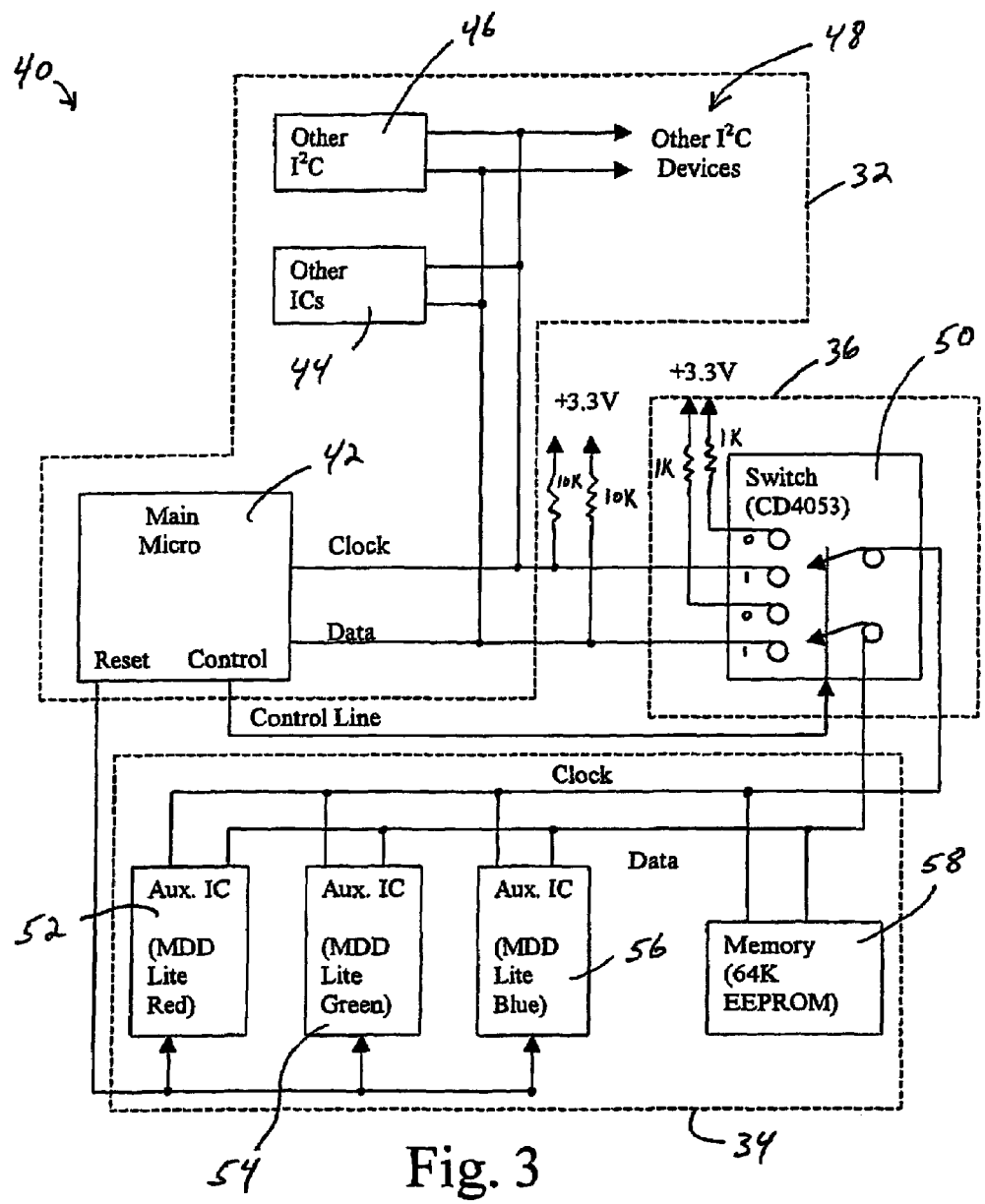
FIG. 3 is an exemplary circuit in accordance with the principles of the present invention.

Referring to FIG. 3, there is depicted an exemplary embodiment of a system for implementing the principles of the present invention. System 40 is preferably within a consumer electronic device, such as consumer electronic device 30 of FIG. 2. System 40 includes main I²C bus/system 32, switching circuitry/logic 36, and auxiliary ICs/circuitry/logic 34.

Main I²C bus/system 32 includes main micro 42 that is coupled to a Clock line and a Data line. Within main I²C bus/system 32 are other ICs 44 that are connected to the Clock line and the Data line, other I²C buses/branches, or the like, 46 that are likewise connected to the Clock line and the Data line, and other I²C devices, generally designated 48 that are likewise connected to the Clock line and the Data line.

System 40 is such that the ICs and other components of main I²C system 32 operate and/or function in accordance with the standard I²C protocol. System 40 also includes auxiliary ICs/circuitry, generally designated 34, that is shown with three auxiliary ICs, namely auxiliary IC 52 (MDD Lite Red), auxiliary IC 54 (MDD Lite Green), and auxiliary IC 56 (MDD Lite Blue). Auxiliary ICs 52, 54, and 56 provide drive signals to generate video images on the LCOS display. In this regard, Auxiliary ICs 52, 54, and 56 include look up tables for generating the correct light output for each pixel of the imager device. Each LCOS device may include variations in the imager device that requires each look up table in the associated EEPROM to include slightly different values. The necessary values may be determined based on, for example, color temperature, imager tolerances, optical tolerances, etc., and may have to be determined during manufacture of each LCOS device. The values determined are then loaded on the EEPROM, and then loaded from the EEPROM onto the respective one of the Auxiliary ICs during start up.

Auxiliary system 34 also contains memory 58, here depicted as a 64K EEPROM. Auxiliary system 34 is I²C compatible by having a Clock line and a Data line that is coupled to each auxiliary ICs and memory. Memory 58 contains pre-loaded instructions/data described above that is to be loaded into auxiliary ICs 52, 54, 56, at a data transfer rate which is in excess of the normal I²C data transfer rate or speed. The data transfer must be completed before operation occurs between the ICs on main I²C system 32.

System 40 also includes switch/switching circuitry/logic 36 that includes switch 50 that may be a CD-4053 CMOS switch, a Control line from main IC 42 to switch 50, and a pair of resistors (here 1KΩ resistors). The 1KΩ resistors (pull-ups) increases the current in the circuitry to quicken transition from the low to high state, which is necessary for proper functioning of the auxiliary ICs during the high transfer rate mode.

Switch 50 is operative, under the control of main micro 42 (via the Control line) to isolate auxiliary ICs 52, 54, 56 and memory 58 by coupling the Clock and Data lines of auxiliary system 34 to separate resistors/pull-ups (coupling the Clock and Data lines of the auxiliary circuit 34 via internal switches to the "0" position in a first, or start-up, position or mode). Switch 50 is also operative, under control of main micro 42 to "de-isolate" auxiliary circuitry 34, or connect the Clock line of auxiliary circuitry 34 to the Clock line of main I²C circuitry 32, and the Data line of the auxiliary circuitry 34 to the Data line of the main I²C circuitry 32 (coupling the Clock and Data lines of the auxiliary circuit 34 via internal switches to the "1" position in a second or operating position or mode). In the de-isolated mode, the Clock and Data lines are coupled to a voltage source (shown as +3.3 volts) through respective resistors (10KΩ each).

During start-up or power-up, main micro 42 sends a control signal (logic "0") to switch 50 such that the Clock and Data lines of auxiliary circuit 34 are pulled up to the voltage source (+3.3 volts) through the respective 1KΩ resistors during a low to high transition. The 1kΩ resistors, or pull-ups, assist in providing sufficient current to support the faster data transfer rate of auxiliary circuit 34. At this time, auxiliary ICs 52, 54, and 56 can sequentially load data from memory 58 at a high data transfer rate such as 400 kHz. In the present LCOS system, each one of Auxiliary ICs 52, 54, and 56 load the data from EEPROM 58 in sequential fashion. That is, when the reset signal is received from main micro 42, a designated one of the auxiliary ICs begins transferring data from EEPROM 48 at the required rate, i.e., 400 kHz. During this period, the designated auxiliary IC acts as the master IC and generates the necessary clock signals. After a predetermined period of time, when data transfer to the designated auxiliary IC is completed, a next one of the auxiliary ICs begins transferring data from EEPROM 48. The order in which the auxiliary ICs transfer data is hard-wired into the ICs. In any event, the auxiliary ICs function as the master IC for a duration sufficient to transfer all of the required data from EEPROM 48. Once sufficient time has elapsed for the data transfer, switch 50 receives a control signal (logic "1") that now couples the Clock and Data lines of auxiliary circuit 34 with main I²C circuitry 32.

Figure 4:
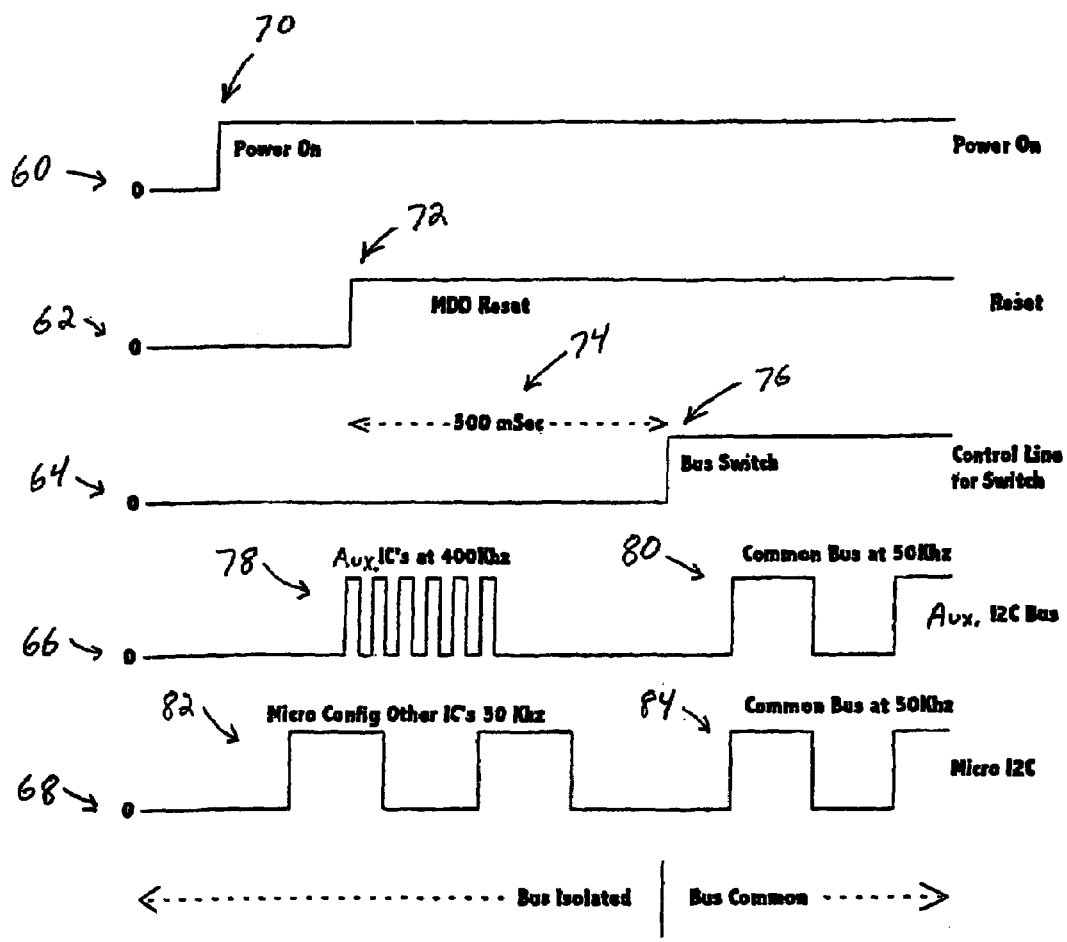
FIG. 4 is a timing chart for various signals of the circuit of FIG. 3.

FIG. 4 depicts the various signals and their timing relationship for I²C system 40 of FIG. 3. In particular, there is depicted power signal 60 for I²C system 40, reset signal 62 for auxiliary ICs (52, 54, 56), control signal 64 for switch 50 (from the main micro/IC 42), auxiliary I²C bus signal 66, and main micro signal 68. Reset signal 62 is also labeled MDD Reset correlating to the exemplary embodiment of FIG. 3 utilizing the MDD ICs from Three-Five Systems, Inc.

At a point in time, power signal 60 transitions from a low (logic "0"), or OFF, state to a high (logic "1"), or ON state, designated 70. Following the power ON command, reset signal 62 on the Reset line from main micro 42 goes from a low state to a high state, at point 72. Control signal 64 on the control line from main micro 42 remains in a low state. This signals the proper operating condition for the auxiliary ICs to transfer data at 400 kHz, see the auxiliary bus signal 66 at point 78, thus, at this time, auxiliary ICs 52, 54, and 56, can communicate with the memory 58 at the faster speed.

During this time, main bus signal 68 can configure (signal portion 82) the remaining ICs on the main I²C bus at the slower I²C speed. Following the 500 millisecond wait period 74, main switch 50 connects auxiliary ICs 52, 54, and 56 to main I²C bus and allows main micro 42 to communicate with all the ICs connected to the bus. The timing relationships of the various signals of FIG. 4 show a bus-isolated portion of the various signals, and a bus common portion of the various signals. The bus-isolated portion corresponds to the time period in which auxiliary circuit 34 is isolated from main I²C circuit 32, and data transfer occurs between auxiliary ICs at the higher rate. The bus common portion corresponds to the time period in which the auxiliary circuit 34 is de-isolated from the main I²C bus.

Figure 5:
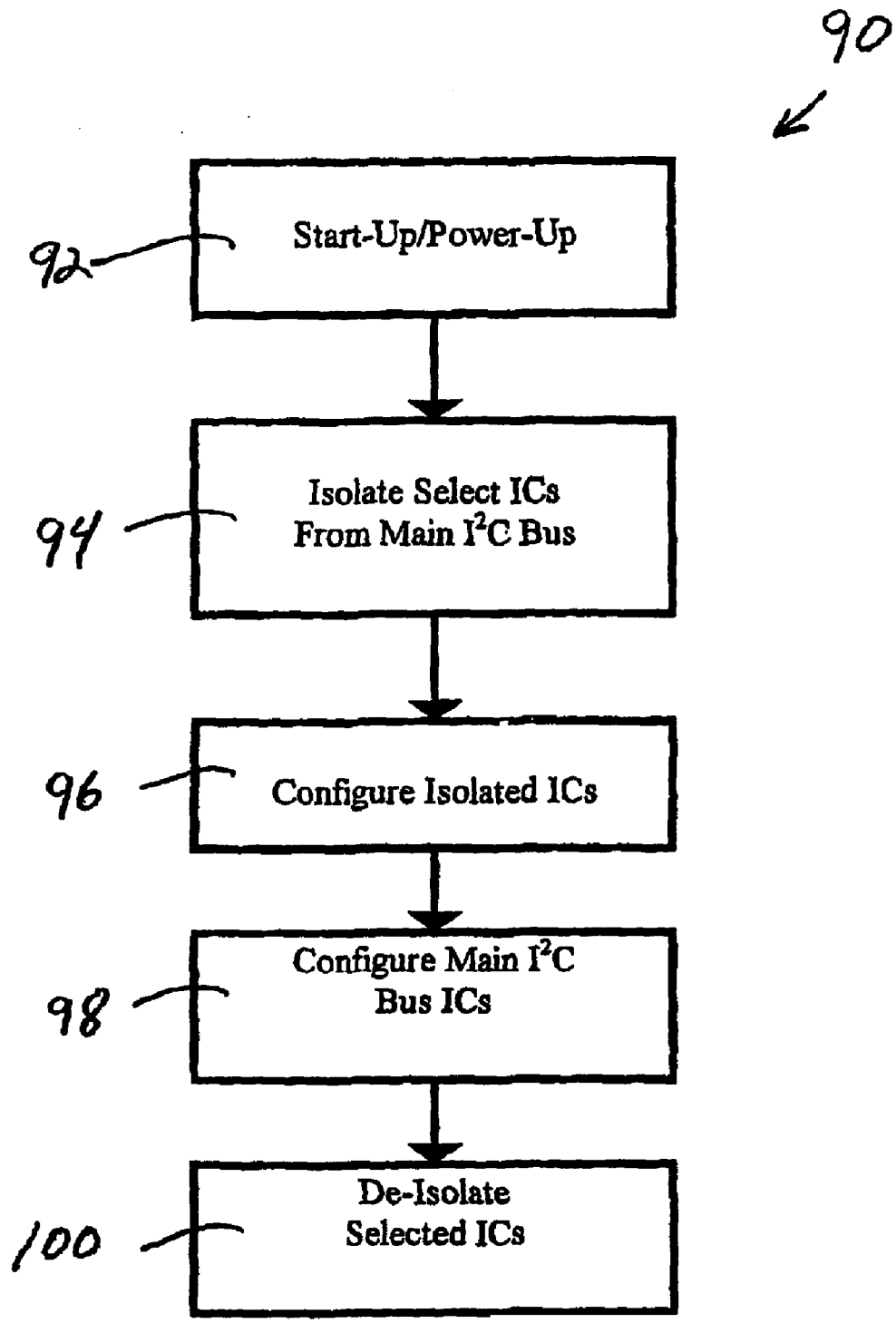
FIG. 5 is a flow chart of the steps performed by the exemplary system of the present invention.

Referring now to FIG. 5, there is depicted a flow chart, generally designated 90, of an exemplary manner of operation of the present invention. In step 92, a power-up, or power-on, signal 60 is generated and applied to I²C system 40 (point 70 of signal 60 of FIG. 4). Shortly thereafter, in step 94, select ICs are isolated from the main I²C bus. In this case, the isolation is affected by the operation of a switch coupled between the main and auxiliary I²C bus systems. Following the isolation, main micro 42 provides a LOW to HIGH reset signal 62 on the Reset line that is coupled to auxiliary ICs 52, 54, 56. At the LOW to HIGH transition 72 of reset signal 62, the auxiliary ICs communicate with memory 58 and/or each other (see the signal portion 78 of the auxiliary/isolated I²C bus signal 66 of FIG. 4). Thus, in step 96, the isolated ICs are configured as necessary at the required speed in a sequential manner described above. At the same time, main micro 42 keeps control signal 64 LOW which causes switch 50 to connect the Clock and Data lines of the auxiliary/isolated I²C bus to a voltage through the 1KΩ pull-up resistors. Again, the 1kΩ pull-up resistors provide the necessary current to auxiliary circuit 34 to support a faster data transfer rate for auxiliary circuit 34.

In step 98, the main I²C bus ICs and associated I²C components are concurrently configured as represented by the micro I²C signal 68 portion 82. After a predetermined time period (here 500 msec) in which the auxiliary ICs have time to complete their communication/configuration, control signal 64 goes from LOW to HIGH at point 76 thereof (see FIG. 4) in order to de-isolate the selected ICs in step 100. Switch 50 thus couples the Clock and Data lines of auxiliary I²C circuit/bus/portion 34 to the Clock and Data lines of the main I²C bus. At this point, the circuit transitions from the "bus isolated" mode where the auxiliary circuit 34 is isolated, to the "bus common" mode where the auxiliary circuit 34 is part of the main I²C bus portion 32. Thus, both auxiliary I²C bus signal 66 and main I²C bus signal 68 shows communication at 50 kHz signal portions 80 and 84 respectively. While this invention has been described as having a preferred design, the present invention can be further modified within the spirit and scope of this disclosure. This application is therefore intended to cover any variations, uses, of adaptations of the invention using its general principles. Further, this application is intended to cover such departures from the present disclosure as come within known or customary practice in the art to which this invention pertains and which fall within the limits of the appended claims.

What is claimed is:

1. A video signal processing apparatus, comprising:
   an I²C bus having main I²C bus portion,
   a controller IC coupled to said main I²C bus portion,
   an auxiliary I²C bus portion having a plurality of auxiliary ICs connected thereto; and
   a switch interposed between said main I²C bus portion and said auxiliary I²C bus portion and in communication with said controller IC,
       said switch operative under control of said controller IC to selectively isolate said auxiliary I²C bus portion from said main I²C bus portion during a first operating mode of the apparatus, wherein said auxiliary ICs communicate with each other via said auxiliary I²C bus-portion at a first data transfer rate, and
       said switch operative under control of said controller IC to selectively couple said auxiliary I²C bus portion to said main I²C bus portion during a second operating mode of the apparatus, wherein said auxiliary ICs communicate with the controller IC via said auxiliary and main I²C bus portions at a second data transfer rate that differs from the first data transfer rate.

2. The apparatus of claim 1, wherein said first operating mode corresponds to a startup mode of the apparatus, and said switch is operative under control of said controller IC to isolate said auxiliary I²C bus portion from said main I²C bus portion for a predetermined period of time during said startup mode.

3. The apparatus of claim 2, wherein said first data transfer rate is greater than said second data transfer rate.

4. The apparatus of claim 1, wherein said switch comprises an integrated circuit switch.

5. The apparatus of claim 1, further comprising a pair of pull-up resistors coupled to said switch; and
   wherein when said switch selectively isolates said auxiliary I²C bus portion from said main I²C bus portion, said pull-up resistors provide increased current for said auxiliary I²C bus portion.

6. The apparatus of claim 1, wherein said auxiliary ICs comprise ICs for generating drive signals for R, G, and B signals, and an IC for storing look up table for generating correct light output for an imager device.

7. A television signal receiver comprising:
   a main I²C bus;
   a controller IC in communication with said main I²C bus;
   a first plurality of I²C compatible ICs operatively coupled to said main I²C bus;
   an auxiliary I²C bus;
   a second plurality of I²C compatible ICs operatively coupled to said auxiliary I²C bus; and
   a switch interposed between said main I²C bus and said auxiliary I²C bus, and in communication with said controller IC,
       said switch under control of said controller IC selectively isolating said auxiliary I²C bus, and thus said second plurality of I²C compatible ICs, from said main I²C bus for a predetermined period of time during a startup mode of the second plurality of I²C compatible ICs, wherein said second plurality of I²C compatible ICs communicate with each other via said auxiliary I²C bus at a first data transfer rate, and
       said switch under control of said controller IC selectively coupling said auxiliary I²C bus, and thus said second plurality of I²C compatible ICs, to said main I²C bus during an operating mode of the second plurality of I²C compatible ICs, wherein said second plurality of I²C compatible ICs communicate with said controller IC via said auxiliary and main I²C buses at a second data transfer rate that is different than the first data transfer rate.

8. The television signal receiver of claim 7, wherein said second plurality of I²C compatible ICs comprise ICs for generating drive signals for R, G, and B signals, and an IC for storing look up table for generating correct light output for an imager device.

9. The television signal receiver of claim 7, wherein said second data transfer rate is greater than said first data transfer rate.

10. The television signal receiver of claim 7, wherein said switch comprises an integrated circuit switch.

11. The television signal receiver of claim 7, wherein isolation of said auxiliary I²C bus by said switch comprises a first mode for said switch; and said switch has a second mode under control of said master IC wherein said auxiliary I²C bus is part of said main I²C bus.

12. The television signal receiver of claim 7, further comprising a pair of pull-up resistors; and wherein when said switch selectively isolates said auxiliary I²C bus from said main I²C bus, said pull-up resistors provide increased current for said auxiliary I²C bus.

13. A method for controlling the operation of a video signal processing apparatus having an I²C bus system, comprising the steps of:

providing a switch interposed between a main I²C bus portion having a main data line and a main clock line, and a controller IC connected thereto, and an auxiliary I²C bus portion having an auxiliary data line and an auxiliary clock line, and a plurality of auxiliary ICs connected thereto;

providing a first control signal to said switch during a first operating mode of said apparatus for causing said switch to isolate said auxiliary I²C bus portion from said main I²C bus portion, and allowing said auxiliary ICs to communicate with each other at a first data transfer rate during said first operating mode, and providing a second control signal to said switch during a second operating mode of said apparatus for causing said switch to couple said auxiliary I²C bus portion to said main I²C bus portion, said auxiliary ICs communicating with said controller IC at a second data transfer rate that is different from said first data transfer rate during said second operating mode.

14. The method of claim 13, further comprising the steps of:

maintaining the switch in the first operating mode for a predetermined period of time when the switch operates in the first operating mode; and causing the switch to operate in the second operating mode after expiration of the predetermined period of time.

15. The method of claim 13, wherein the steps of providing first and second control signals include the step of:

causing the controller IC in communication with the main I²C bus portion to generate the control signal.

16. The method of claim 15, wherein the controller IC generates the control signal upon a power-up condition of the main I²C bus portion.

17. The method of claim 15, further comprising the steps of:

loading data from a look up table for generating the correct light output for each pixel of an imager device into the auxiliary ICs during the first operating mode; and generating R, G, B signals using the auxiliary ICs during the second operating mode.

18. The method of claim 17, wherein the first data transfer rate is greater than the second data transfer rate.

19. The method of claim 13, further comprising the step of:

increasing current to the auxiliary I²C bus portion during the second operating mode.

20. The method of claim 19, wherein the step of increasing current to the auxiliary I²C bus portion during the second operating mode includes the step of:

providing a resistor coupled to a power supply for the auxiliary data line and the auxiliary clock line.

* * * * *